US008060066B2

(12) United States Patent
Gregg et al.

(10) Patent No.: US 8,060,066 B2
(45) Date of Patent: Nov. 15, 2011

(54) SYSTEM AND METHOD FOR TRANSMITTING RDS/RBDS DATA

(75) Inventors: Christopher Gregg, Austin, TX (US); Gerald Champagne, Buda, TX (US)

(73) Assignee: Silicon Laboratories Inc., Austin, TX (US)

( * ) Notice: Subject to any disclaimer, the term of this patent is extended or adjusted under 35 U.S.C. 154(b) by 794 days.

(21) Appl. No.: 11/850,764

(22) Filed: Sep. 6, 2007

(65) Prior Publication Data

US 2009/0068964 A1 Mar. 12, 2009

(51) Int. Cl.

| | |
|---|---|
| ***H04M 3/42*** | (2006.01) |
| *H04L 29/08* | (2006.01) |
| *H04H 20/71* | (2008.01) |

(52) U.S. Cl. .................. 455/414.1; 455/414.4; 455/3.01

(58) Field of Classification Search ................. 455/3.01, 455/3.02, 45, 186.1, 63.1, 114.2, 278.1, 296, 455/414.1–414.4, 412.1, 412.2, 3.06

See application file for complete search history.

(56) References Cited

U.S. PATENT DOCUMENTS

| | | | | |
|---|---|---|---|---|
| 6,411,800 | B1 * | 6/2002 | Emerson, III | 455/186.1 |
| 6,711,390 | B1 * | 3/2004 | Moers | 455/186.1 |
| 2007/0259650 | A1 * | 11/2007 | Felder | 455/412.1 |

OTHER PUBLICATIONS

National Radio Systems Committee, "NRSC-4-A United States RBDS Standard, Specification of the radio broadcast data system", Apr. 2005, pp. 1-76. >>http://www.nrscstandards.org<<, NAB: 1771 N. St. NW, Washington, DC 20036.

* cited by examiner

*Primary Examiner* — Eugene Yun

(74) *Attorney, Agent, or Firm* — O'Keefe, Egan, Peterman & Enders, LLP

(57) ABSTRACT

A receiver including first circuitry configured to combine corresponding soft decision values from at least two groups of RDS/RBDS data transmitted as part of a broadcast channel to generate a set of combined values and second circuitry configured to identify a subset of the combined values that indicate a relatively constant subset of the received values from the at least two groups of the RDS/RBDS data is provided.

23 Claims, 6 Drawing Sheets

SYSTEM AND METHOD FOR TRANSMITTING RDS/RBDS DATA

BACKGROUND

Radio frequency (RF) transmitters are used in a wide variety of applications such as cellular or mobile telephones, cordless telephones, personal digital assistants (PDAs), computers, radios and other devices that transmit or receive RF signals. RF transmitters may be used to transmit RDS (Radio Data System) and/or RBDS (Radio Broadcast Data System) data for display by a receiver of the RDS/RBDS data. The RDS/RBDS data may include the name of a broadcast station and a description of the broadcast content being played by the receiver, for example. To minimize costs and power consumption, an RF transmitter may have a limited amount of storage for storing RDS/RBDS data and a limited amount of time to receive the RDS/RBDS data from a host.

SUMMARY

According to one exemplary embodiment, a transmitter including first circuitry configured to store a first instance of recurring RDS/RBDS data and second circuitry configured to prevent a second and subsequent instances of the recurring RDS/RBDS data from being stored and configured to generate at least two RDS/RBDS groups using at least a portion of the first instance of the recurring RDS/RBDS data is provided.

In another exemplary embodiment, a method performed by a low intermediate frequency transmitter is provided. The method includes storing a first instance of first recurring RDS/RBDS data, preventing a second and subsequent instances of the first recurring RDS/RBDS data from being stored, and generating a first set of at least two RDS/RBDS groups using at least a portion of the first instance of the first recurring RDS/RBDS data.

In further exemplary embodiment, a program product is provided. The program product includes a program and a medium for storing the program. The program is executable by processing circuitry for causing a transmitter to store a first instance of recurring RDS/RBDS data, prevent a second and subsequent instances of the recurring RDS/RBDS data from being stored, and generate at least two RDS/RBDS groups using at least a portion of the first instance of the recurring RDS/RBDS data.

In yet another exemplary embodiment, a system comprising a transmitter and a host configured to provide at least a first instance of recurring RDS/RBDS data to the transmitter is provided. The transmitter is configured to store the first instance of the recurring RDS/RBDS data, prevent a second and subsequent instances of the recurring RDS/RBDS data from being stored, and generate at least two RDS/RBDS groups using at least a portion of the first instance of the recurring RDS/RBDS data.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

As described herein, an integrated transmitter is provided for use in transmitting radio-frequency (RF) signals or signals from other frequency bands. The transmitter includes an RDS/RBDS unit that is configured to encode and transmit RDS (Radio Data System) and/or RBDS (Radio Broadcast Data System) data. The transmitter receives RDS/RBDS data from a host. The RDS/RBDS unit operates to minimize the amount of storage needed for transmitting RDS/RBDS data and to minimize the amount of time needed to interact with an external host that provides the data. To do so, blocks of the first instance of recurring RDS/RBDS data and parameters associated with the data are stored and subsequent instances of the recurring RDS/RBDS data are not stored. The recurring data may include the Program Identification (PI) code, Program Service (PS) messages, RadioText (RT) messages, RadioText Plus (RT+) messages, Open Data Application (ODA) messages, for example. The RDS/RBDS unit automatically generates RDS/RBDS data for transmission using the stored instances of RDS/RBDS data and the stored parameters to minimize the amount of storage for RDS/RBDS data and the amount of time needed to interact with the host.

The transmitters described herein may be used in a wide variety of integrated communications systems. Although terrestrial RF transmitters, e.g., FM and AM transmitters, are described herein, these receivers are presented by way of example. In other embodiments, other frequency bands may be used.

Figure 1A:
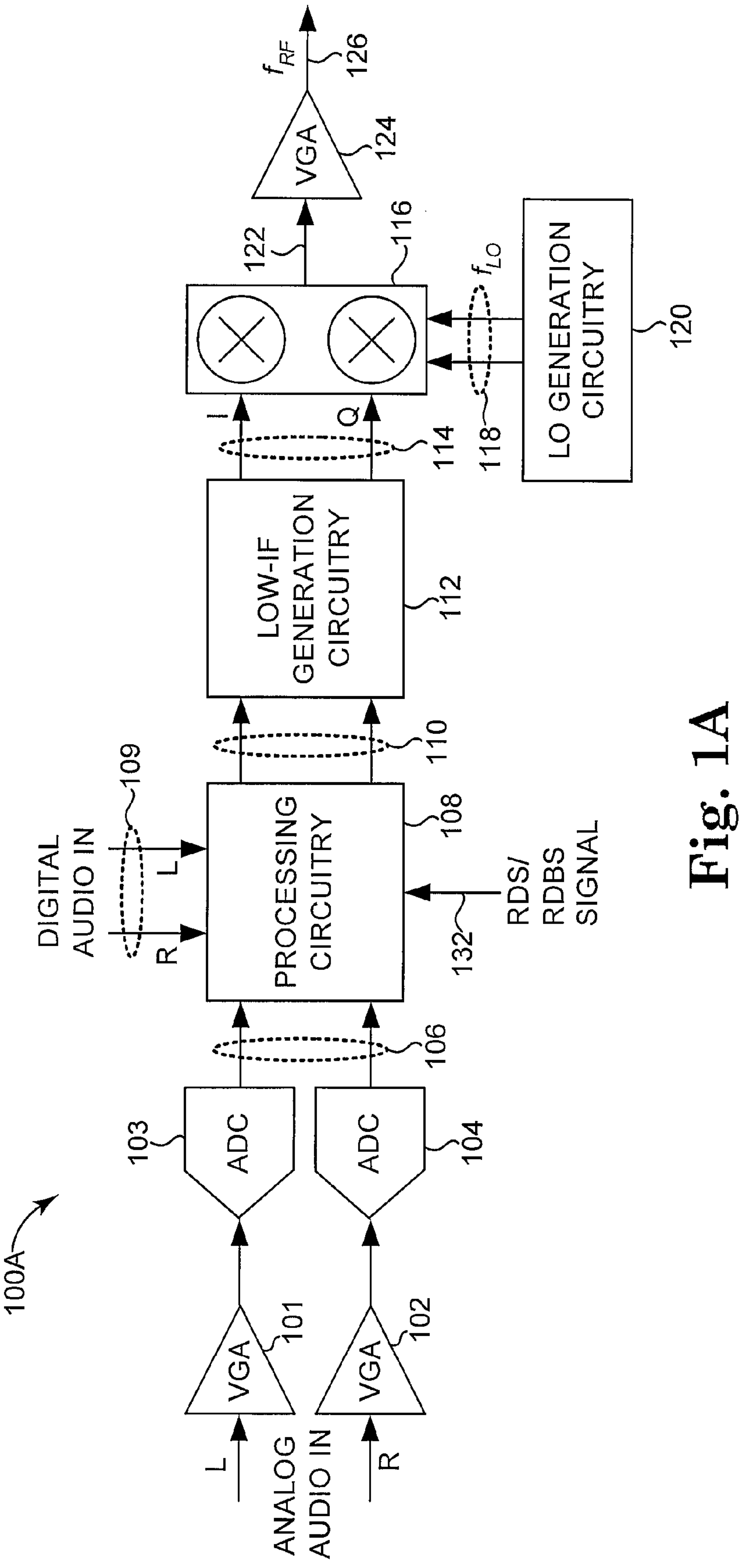
FIGS. 1A-1C are block diagrams illustrating embodiments of a low intermediate frequency (low-IF) transmitter.

FIG. 1A is a block diagram illustrating an embodiment 100A of a low intermediate frequency (IF) transmitter 100. Transmitter 100A includes variable gain amplifiers (VGAs) 101 and 102, analog-to-digital converters (ADCs) 102 and 104, processing circuitry 108, low IF generation circuitry 112, an RF mixer 116, local oscillator (LO) generation circuitry 120, and a VGA 124.

Transmitter 100A is configured to transmit radio-frequency (RF) output signals, $f_{RF}$, 126 from an analog or digital audio input signal using a low intermediate frequency (IF) architecture. In one embodiment, transmitter 100A forms an integrated terrestrial broadcast transmitter configured to transmit radio-frequency (RF) signals. As used herein, an RF signal means an electrical signal conveying useful information and having a frequency from about 3 kilohertz (kHz) to thousands of gigahertz (GHz), regardless of the medium through which the signal is conveyed. Thus, an RF signal may be transmitted through air, free space, coaxial cable, and/or fiber optic cable, for example. In other embodiments, transmitter 100A may be configured to transmit signals 126 in another suitable frequency range.

In one embodiment, transmitter 100A is configured as an AM/FM terrestrial broadcast transmitter. In this embodiment, RF output signals 126 are transmitted in the AM/FM terrestrial broadcast spectrum at selected AM and FM broadcast channels centered at different broadcast frequencies. In other embodiments, transmitter 100A may be configured as a terrestrial broadcast transmitter where signals 126 include other terrestrial broadcast spectra with other channels.

VGAs 101 and 102 receive respective left (L) and right (R) analog audio input signals, amplify the respective signals, and provide the respective signals to ADCs 103 and 104. ADCs 103 and 104 convert the analog audio input signals to first and second sets of N bit digital signals 106, respectively, and provide the sets of N bit digital signals 106 to processing circuitry 108.

Processing circuitry 108 receives the sets of N bit digital signals 106 from ADCs 103 and 104. Processing circuitry 108 also receives left (L) and right (R) digital audio input signals 109. Processing circuitry 108 performs any suitable audio processing on signals 106 and signals 109 such as signal conditioning (e.g., tone, amplitude, or compression) and FM and AM modulation to produce digital output signals 110. When signals 106 or signals 109 are to be included in an FM broadcast, processing circuitry 108 may perform digital processing that includes, for example, FM modulation and stereo encoding on signals 106 or signals 109. Digital output signals 110 may include left (L) and right (R) digital audio output channels that represent the content of the FM broadcast channel to be transmitted. Processing circuitry 108 provides processed signals 110 to low IF generation circuitry 112.

Processing circuitry 108 also receives RDS (Radio Data System) and/or RBDS (Radio Broadcast Data System) signals 132 and combines RDS/RBDS signals 132 with processed signals 106 or 109 to form digital output signals 110. RDS/RBDS signals 132 include RDS/RBDS data in a low data rate (i.e., 1187.5 bits/s) digital data stream. RDS/RBDS data is transmitted and received in accordance with the international Radio Data System (RDS) standard IEC/CENELEC 62106 initially developed by the European Broadcasting Union (EBU) and/or the United States RBDS Standard, Specification of the radio broadcast data system (RBDS) published by the National Radio Systems Committee as NRSC-4-A and available from www.nrscstandards.org.

Processing circuitry 108 forms digital output signals 110 to transmit the RDS/RBDS data from signals 132 in the FM broadcast channel of RF output signals 126. Processing circuitry 108 performs differential and biphase symbol encoding, block synchronization, and error correction functions for the RDS/RBDS data from RDS/RBDS signals 132 in accordance with the RDS/RBDS standards. Processing circuitry 108 includes the encoded data in digital output signals 110 at low modulation levels (i.e., ~2 kHz) to cause the RDS/RBDS data from signals 132 to be transmitted with processed signals 106 or 109 in the FM broadcast channel of RF output signals 126.

Processing circuitry 108 operates to minimize the amount of storage needed for transmitting RDS/RBDS data and to minimize the amount of time needed to interact with an external host that provides the data. To do so, processing circuitry 108 stores the first instance of recurring RDS/RBDS data and allows the host to specify parameters associated with the recurring data. Processing circuitry 108 and/or the external host prevent subsequent instances of recurring RDS/RBDS data from being stored. The recurring data may include the Program Identification (PI) code, Program Service (PS) messages, RadioText (RT) messages, RadioText Plus (RT+) messages, Open Data Application (ODA) messages, for example. Using the stored instances of RDS/RBDS data and the stored parameters, processing circuitry 108 automatically generates RDS/RBDS data for transmission and thereby minimizes the amount of storage for RDS/RBDS data and the amount of time needed to interact with the host.

Low IF generation circuitry 112 receives processed signals 110 from processing circuitry 108. Low IF generation circuitry 112 upconverts the processed signals to an intermediate frequency and converts the digital upconverted signals to analog signals. In the embodiment of FIG. 1A, low IF generation circuitry 112 upconverts the processed signals to produce a quadrature output with real (I) and imaginary (Q) signals 114. In other embodiments, low IF generation circuitry 112 upconverts the processed signals to produce other signal types. Low IF generation circuitry 112 provides analog signals 114 to RF mixer 116. Low IF generation circuitry 112 may also provide signal gain and/or perform signal filtering functions on signals 110.

RF mixer 116 receives analog signals 114 from low IF generation circuitry 112. RF mixer 116 upconverts analog signals 114 to RF signals 122 with a desired transmit frequency (e.g., a desired FM broadcast frequency) by combining analog signals 114 with phase shifted local oscillator (LO) mixing signals, $f_{LO}$, 118 provided by LO generation circuitry 130. LO generation circuitry 130 includes oscillation circuitry (not shown) and outputs the two out-of-phase LO mixing signals 118 that are used by RF mixer 116. RF mixer 116 provides RF signals 122 to VGA 124. VGA 124 amplifies RF signals 122 to generate RF output signals 126 at a desired signal level.

For purposes of illustration, RF output signals 126 of transmitter 100A described herein may be transmitted in signal bands such as AM audio broadcast bands, FM audio broadcast bands, television audio broadcast bands, weather channel bands, or other desired broadcast bands. The following table provides example frequencies and uses for various broadcast bands that may be transmitted by transmitter 100A.

TABLE 1

EXAMPLE FREQUENCY BANDS AND USES

| FREQUENCY | USES/SERVICES |
|---|---|
| 150-535 kHz | European LW radio broadcast<br>9 kHz spacing |
| 535-1700 kHz | MW/AM radio broadcast<br>U.S. uses 10 kHz spacing<br>Europe uses 9 kHz spacing |
| 1.7-30 MHz | SW/HF international radio broadcasting |
| 46-49 MHz | Cordless phones, baby monitors, remote control |
| 59.75 (2) MHz | U.S. television channels 2-6 (VHF_L) |
| 65.75 (3) MHz | 6 MHz channels at 54, 60, 66, 76, 82 |
| 71.75 (4) MHz | Audio carrier is at 5.75 MHz (FM MTS) |
| 81.75 (5) MHz | |
| 87.75 (6) MHz | |
| 47-54 (E2) MHz | European television |
| 54-61 (E3) MHz | 7 MHz channels, FM sound |
| 61-68 (E4) MHz | Band I: E2-E4 |
| 174-181 (E5) MHz | Band II: E5-E12 |
| 181-188 (E6) MHz | |
| 188-195 (E7) MHz | |
| 195-202 (E8) MHz | |
| 202-209 (E9) MHz | |
| 209-216 (E10) MHz | |
| 216-223 (E11) MHz | |
| 223-230 (E12) MHz | |
| 76-91 MHz | Japan FM broadcast band |
| 87.9-108 MHz | U.S./Europe FM broadcast band<br>200 kHz spacing (U.S.)<br>100 kHz spacing (Europe) |

TABLE 1-continued

| EXAMPLE FREQUENCY BANDS AND USES | |
|---|---|
| FREQUENCY | USES/SERVICES |
| 162.550 (WX1) MHz | U.S. Weather Band |
| 162.400 (WX2) MHz | 7 channels, 25 kHz spacing |
| 162.475 (WX3) MHz | SAME: Specific Area Message Encoding |
| 162.425 (WX4) MHz | |
| 162.450 (WX5) MHz | |
| 162.500 (WX6) MHz | |
| 162.525 (WX7) MHz | |
| 179.75 (7) MHz | U.S. television channels 7-13 (VHF_High)<br>6 MHz channels at<br>174, 180, 186, 192, 198, 204, 210 |
| 215.75 (13) MHz | FM Sound at 5.75 MHz |
| 182.5 (F5) MHz | French television F5-F10 Band III<br>8 MHz channels |
| 224.5 (F10) MHz | Vision at 176, 184, 192, 200, 208, 216 MHz<br>AM sound at +6.5 MHz |
| 470-478 (21) MHz | Band IV - television broadcasting<br>Band V - television broadcasting |
| 854-862 (69) MHz | 6 MHz channels from 470 to 862 MHz<br>U.K. System I (PAL):<br>Offsets of +/−25 kHz may be used to alleviate co-channel interference<br>AM Vision carrier at +1.25 (Lower Sideband vestigial)<br>FMW Sound carrier at +7.25<br>Nicam digital sound at +7.802<br>French System L (Secam):<br>Offsets of +/−37.5 kHz may be used<br>AM Vision carrier at +1.25 (inverted video)<br>FMW Sound carrier at +7.75<br>Nicam digital sound at +7.55 |
| 470-476 (14) MHz | U.S. television channels 14-69<br>6 MHz channels |
| 819-825 (69) MHz | Sound carrier is at 5.75 MHz (FM MTS)<br>14-20 shared with law enforcement |

Figure 1B:
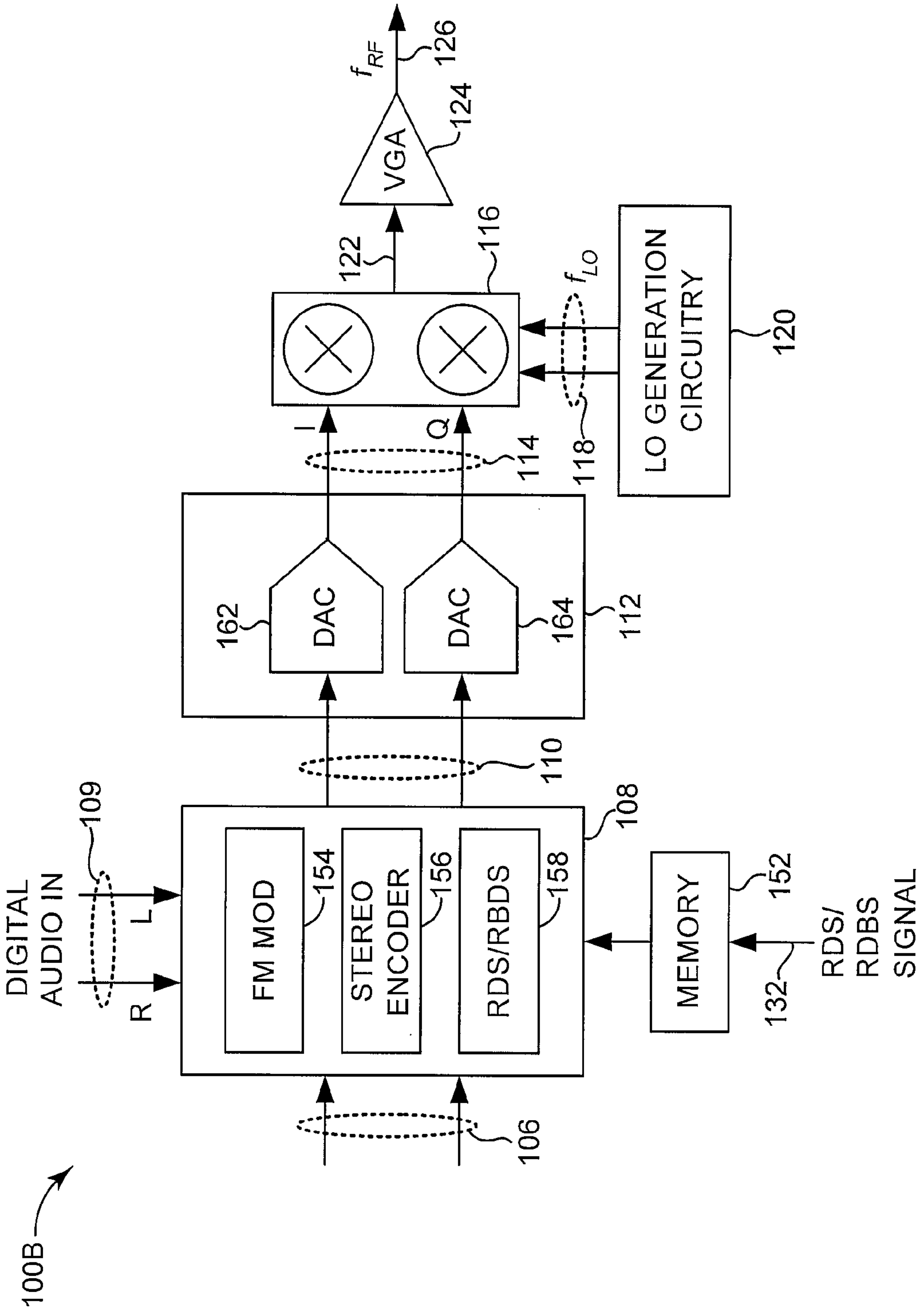

FIG. 1B is a block diagram illustrating an embodiment 100B of transmitter 100. In transmitter 100B, processing circuitry 108 receives signals 106 from ADCs 103 and 104 and digitally processes signals 106 to perform FM modulation using a FM modulator 154 and stereo encoding, such as MPX encoding, using a stereo decoder 156 and generate digital signals 110.

Low IF generation circuitry 112 upconverts digital audio signals 110 to a quadrature output with real (I) and imaginary (Q) signals. Integrated DACs 162 and 164 in low IF generation circuitry 112 convert the real (I) and imaginary (Q) digital signals to real (I) and imaginary (Q) analog signals 114, respectively. Low IF generation circuitry 112 may also provide signal gain and/or perform signal filtering functions on signals 110.

In addition, processing circuitry 108 processes RDS/RBDS data using RDS/RBDS unit 158. An external host (such as host 502 in FIG. 5) provides RDS/RBDS data to transmitter 100B using RDS/RBDS signal 132. Transmitter 100B stores the RDS/RBDS data in a memory 152. RDS/RBDS unit 158 accesses the RDS/RBDS data from memory 152, encodes the RDS/RBDS data, and includes the encoded RDS/RBDS data in baseband signals 110 for transmission as part of RF output signals 126.

Figure 2:
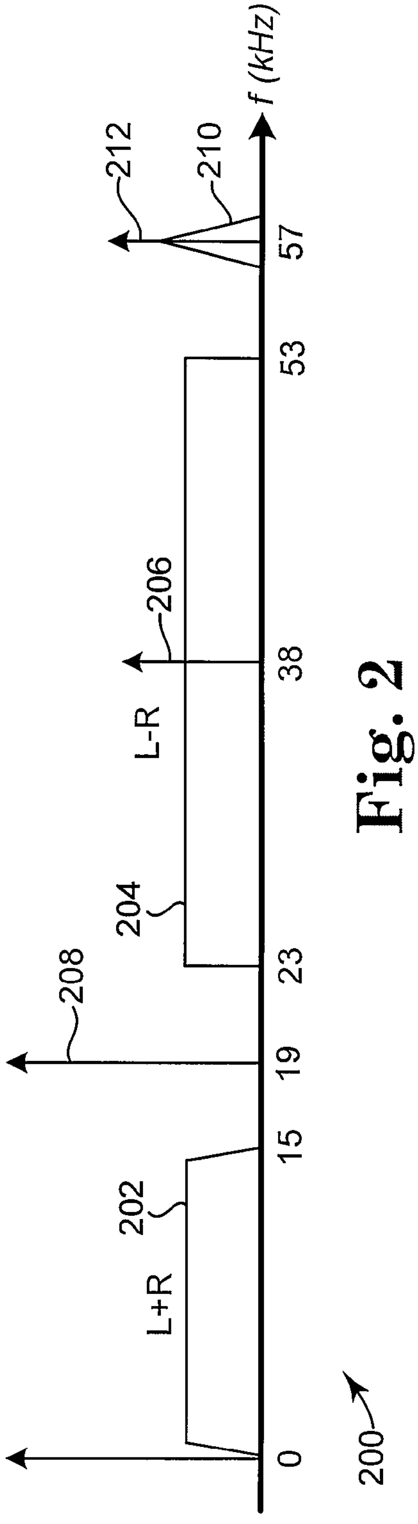
FIG. 2 is a graphical diagram illustrating one embodiment of a baseband spectrum for an FM stereo broadcast.

FIG. 2 is a graphical diagram illustrating one embodiment of a baseband spectrum 200 for an FM stereo broadcast channel with left (L) and right (R) channels generated in signals 110 by transmitter 100B in one embodiment. In spectrum 200, a signal 202 from 30 Hz to 15 kHz includes the sum of the left and right stereo channels (L+R) and is transmitted as baseband audio in signals 110. A signal 204 includes the difference between the left and right stereo channels (L−R). Signal 204 is amplitude-modulated onto a suppressed carrier 206 at 38 kHz to produce a double-sideband suppressed carrier (DSBSC) from 23 kHz to 53 kHz in signals 110. A pilot tone 208 at 19 kHz in signals 110 is used by a receiver to generate carrier 206 with the correct phase. Spectrum 200 also includes RDS/RBDS signals 210 from 55 kHz to 59 kHz and centered at a subcarrier 212 at 57 kHz (i.e., the third harmonic of pilot tone 208) in signals 110.

RDS/RBDS signals 210 represent a digital data stream of the RDS/RBDS data from the external host. RDS/RBDS unit 158 forms RDS/RBDS signals 210 by differentially encoding the digital data stream using the encoding scheme shown in TABLE 1, converting differentially encoded signal to a biphase symbol signal, and mixing the biphase symbol signal with a 57 kHz subcarrier to form RDS/RBDS signals 210 in signals 110.

TABLE 1

| PREVIOUS OUTPUT (at time $t_{i-1}$) | CURRENT INPUT (at time $t_i$) | CURRENT OUTPUT (at time $t_i$) |
|---|---|---|
| 0 | 0 | 0 |
| 0 | 1 | 1 |
| 1 | 0 | 1 |
| 1 | 1 | 0 |

Figure 3:
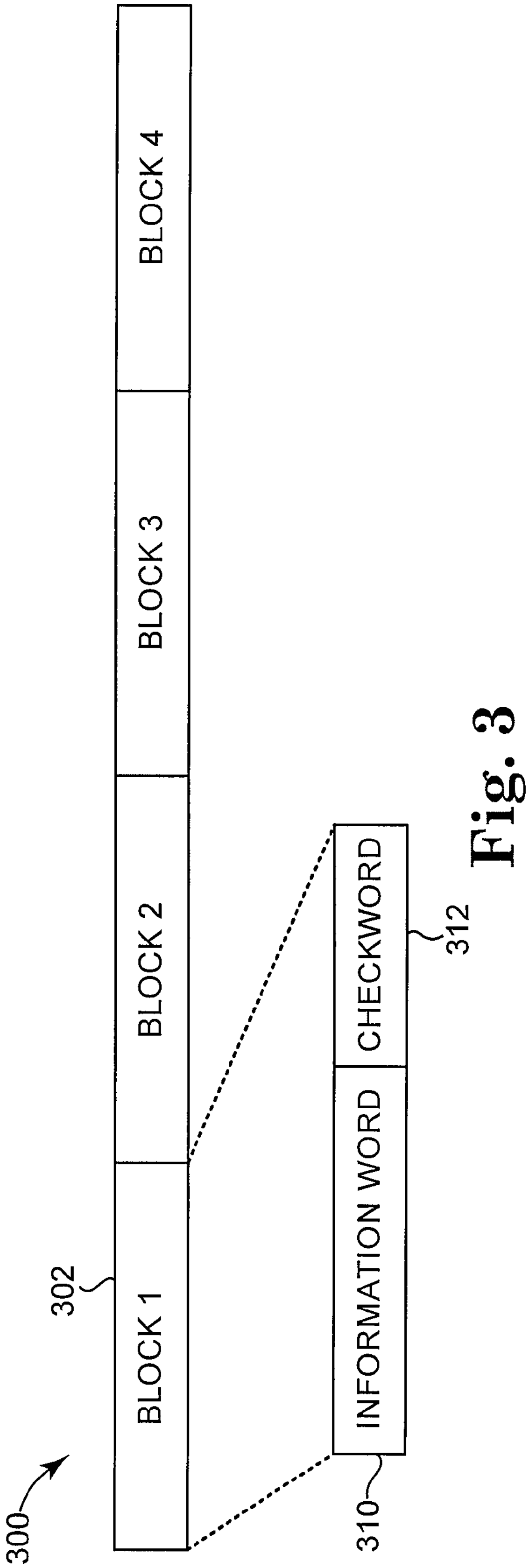
FIG. 3 is a block diagram illustrating one embodiment of an RDS/RBDS baseband coding structure.

RDS/RBDS unit 158 generates RDS/RBDS signals 210 using an RDS/RBDS baseband coding structure as shown in the embodiment of FIG. 3. The structure forms a group 300 of 104 bits with four blocks 302—blocks 1, 2, 3, and 4. Each of blocks 1, 2, 3, and 4 includes 26 bits where the first 16 bits form an information word 310 and the remaining 10 bits form a checkword 312 in each block 302. RDS/RBDS unit 158 causes the bits of each group 300 to be synchronously transmitted without gaps where the most significant bit of each block 302 is transmitted first.

Checkword 312 of block 1 includes an offset word A, checkword 312 of block 2 includes an offset word B, checkword 312 of block 3 includes an offset word C or C', and checkword 312 of block 4 includes an offset word D. Because offset words A, B, C or C', and D may be used to identify blocks 1, 2, 3, and 4, respectively, blocks 1, 2, 3, and 4 may also be referred to as blocks A, B, C or C', and D, respectively. Each checkword 312 is the sum (modulo 2) of a) the remainder after multiplication by $x^{10}$ and then division (modulo 2) by the generator polynomial g(x), of the 16-bit information word 310, b) a 10-bit binary string d(x), called the "offset word", where the generator polynomial, g(x) is given by Equation I:

$$g(x)=x^{10}+x^8+x^7+x^5+x^4+x^3+1 \qquad \text{Equation I}$$

and where the offset values, d(x), which are different for each block 302 within a group 300 are defined by the RDS/RBDS Standard.

RDS/RBDS unit 158 differentially encodes each group 300, converts the differential encodings into biphase symbols, and mixes the symbol stream with a 57 kHz mixing signal to form a mixed RDS/RBDS signal. Processing circuitry 108 includes the mixed RDS/RBDS signal in baseband signals 110.

Transmitter 100B may be configured to operate with cost and power consumption constraints in transmitting RDS/RBDS data. In transmitter 100B, the amount of storage of memory 152 may be limited to reduce the costs of transmitter 100B. In addition, transmitter 100B operates to minimize the amount of interaction with the host in receiving RDS/RBDS data to allow an external host to conserve power. By minimizing the amount of interaction with transmitter 100B, the host can increase the amount of time that it enters a "sleep" or other low power mode and thereby reduce power consumption.

RDS/RBDS unit 158 forms groups 300 of RDS/RBDS data to minimize the amount of storage in memory 152 and minimize the amount of time needed to interact with the host. To do so, RDS/RBDS unit 158 and/or an external host prevent redundant instances of RDS/RBDS data, such as the Program Identification (PI) code, Program Service (PS) messages, RadioText (RT) messages, RadioText Plus (RT+) messages, Open Data Application (ODA) messages, from being stored in memory 152. RDS/RBDS unit 158 provides storage locations in memory 152 for recurring RDS/RBDS data and allows the host to specify parameters associated with the recurring data. Using the stored blocks of RDS/RBDS data and the stored parameters, RDS/RBDS unit 158 automatically generates selected groups 300 of RDS/RBDS data. By doing so, RDS/RBDS unit 158 minimizes the amount of storage in memory 152 and the amount of time needed to interact with the host.

Figure 4:
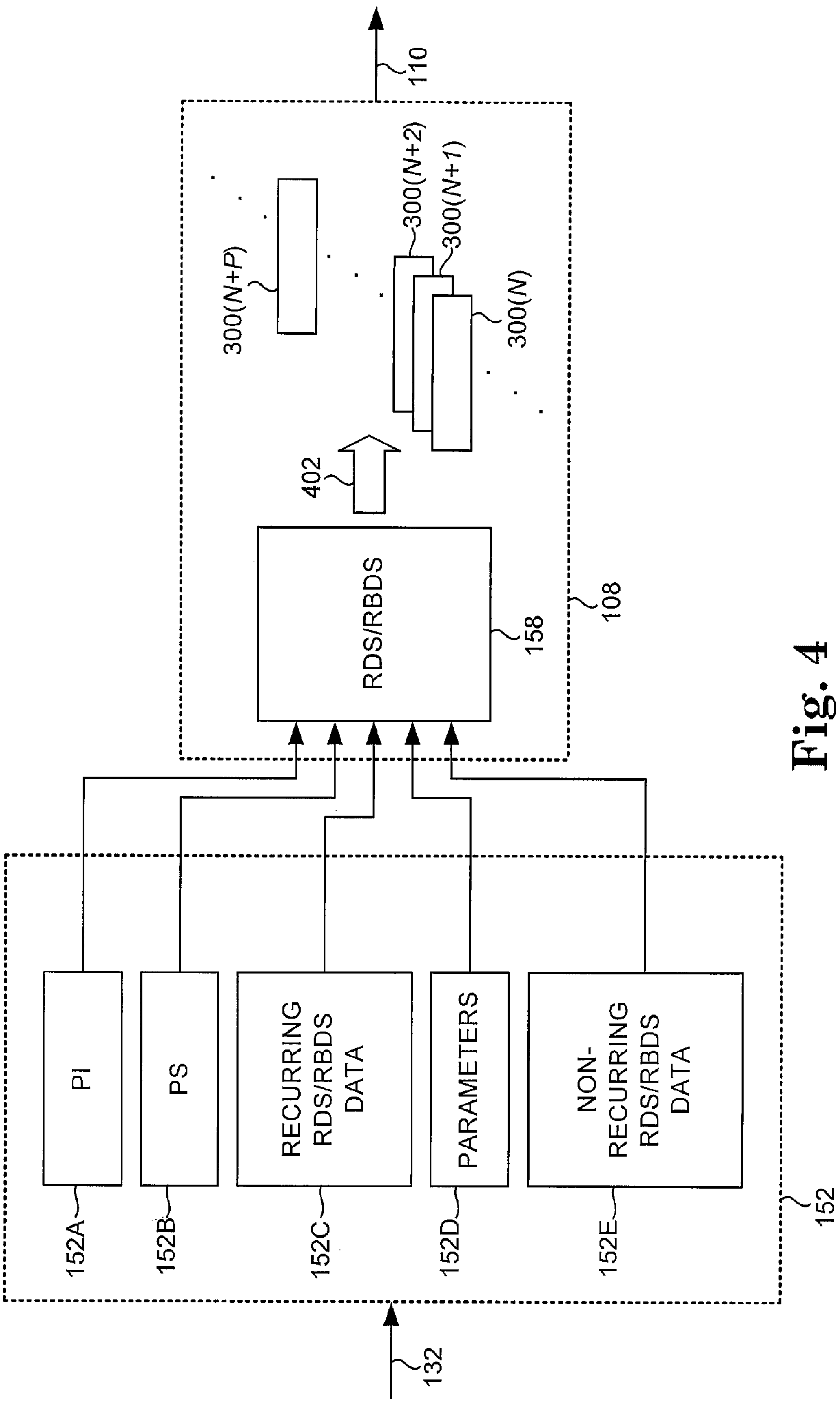
FIG. 4 is a block diagram illustrating one embodiment of the operation of an RDS/RBDS unit.

FIG. 4 is a block diagram illustrating one embodiment of the operation of RDS/RBDS unit 158 in conjunction with memory 152.

Memory 152 includes a storage location 152A for a Program Identification (PI) code, a storage location 152B for a Program Service (PS) message, a storage location 152C for recurring RDS/RBDS data such as RadioText (RT) messages, a storage location 152D for parameters from the host, and a storage location 152E for non-recurring RDS/RBDS data.

An external host provides RDS/RBDS data and parameters to memory 152 using RDS/RBDS signals 132. The RDS/RBDS data may include Program Identification codes, Program Service strings, RadioText messages, and other RDS/RBDS data. As used here with reference to RDS/RBDS data, recurring data refers to data that remains constant in at least two groups 300 of RDS/RBDS data. Groups 300 with recurring data may be consecutive groups 300 or non-consecutive groups 300.

In one embodiment, the host provides an address or other identifying, information to memory 152 to store Program Identification codes in storage location 152A, Program Service strings in storage location 152B, other recurring RDS/RBDS data such as RadioText messages in storage location 152C, parameters in storage location 152D, and/or other non-recurring RDS/RBDS data in storage location 152E. In this embodiment, host may prevent redundant data from being stored in memory 152E or other locations in memory 152 (not shown) by not providing the second and subsequent instances of recurring RDS/RBDS data to transmitter 100B.

In another embodiment, RDS/RBDS unit 158 analyzes the RDS/RBDS data to identify Program Identification codes, Program Service strings, RadioText messages, parameters, and other recurring and non-recurring RDS/RBDS data. Prior to be analyzed, the RDS/RBDS data may be stored in storage location 152E. Subsequent to being analyzed, RDS/RBDS unit 158 causes Program Identification codes to be stored in storage location 152A, Program Service strings to be stored in storage location 152B, recurring RDS/RBDS data such as RadioText messages to be stored in storage location 152C, parameters to be stored in storage location 152D, and other non-recurring RDS/RBDS data to be stored in storage location 152E. RDS/RBDS unit 158 also discards redundant data (i.e., the second and subsequent instances of recurring RDS/RBDS data) in memory 152E by deleting the redundant data from memory 152E or otherwise preventing the redundant data from being stored in memory 152E.

In other embodiments, RDS/RBDS unit 158 and the host operate in conjunction to minimize the storage of recurring data in memory 152. In these embodiments, RDS/RBDS unit 158 discards selected redundant data from the host, and the host provides other recurring data to memory 152 intermittently or prevents the other recurring data from being stored in memory 152.

One example of recurring data is the Program Identification code. In RDS/RBDS data, the Program Identification code generally remains constant for a given broadcast with a given broadcast channel. For a given broadcast, RDS/RBDS unit 158 includes the Program Identification code in block A of every group 300 and in block C' of every group 300 where a block C' is used in place of a block C. Storage location 152A includes an amount of storage that is sufficient to store a Program Identification code.

In one embodiment, the host intermittently stores a first instance of a Program Identification code in storage location 152A and prevents the second and subsequent instances of the Program Identification code from being provided to or stored in memory 152E for a given broadcast.

In another embodiment, RDS/RBDS unit 158 stores a first instance of the Program Identification code from the host in storage location 152A and discards the second and all subsequent instances of the Program Identification code in blocks A and C' from memory 152 for a given broadcast. RDS/RBDS unit 158 identifies each group 300 with a block C' (also referred to in the RDS/RBDS standard as a version B group) using the $B_0$ bit in block B of that group 300.

Another example of recurring data is a Program Service string that is to be transmitted in two or more times. Each Program Service string includes a set of eight characters. The eight characters are transmitted in four groups 300 by including two of the eight characters as 8-bit text characters in each block D of the four groups 300. A host may repeatedly transmit a Program Service string to cause it to be displayed on a receiver continuously or for a desired length of time. Although discouraged by the RDS/RBDS standards, RDS/RBDS unit 158 may implement scrolling program service by periodically transmitting different Program Service strings provided by the host. By doing so, RDS/RBDS unit 158 may cause a series of different Program Service strings to be scrolled or otherwise displayed on an RDS/RBDS receiver. Storage location 152B includes an amount of storage that is sufficient to store one or more Program Service strings.

In one embodiment, the host stores intermittently a first instance of each of one or more Program Service strings in storage location 152B and the corresponding counter and ratio parameters in parameters 152D. The host prevents the second and subsequent instances of the Program Service strings from being provided to or stored in memory 152E in this embodiment.

In another embodiment, RDS/RBDS unit 158 stores a first instance of each of one or more Program Service strings from the host in storage location 152B and counter and ratio parameters from the host in storage location 152D where each counter parameter indicates a number of times to transmit a respective Program Service string and the ratio parameter indicates a ratio of Program Service strings to other RDS/RBDS data to be transmitted by RDS/RBDS unit 158. RDS/RBDS unit 158 discards the second and subsequent instances of the Program Service strings from memory 152.

A further example of recurring data is a RadioText message that is to be transmitted in two or more times. Each RadioText message includes a set of 32 or 64 characters. 32 character RadioText messages are transmitted in 16 groups 300 by including two of the 32 characters as 8-bit text characters in each block D of the 16 groups 300. 64 character RadioText messages are transmitted in 16 groups 300 by including two of the 64 characters as 8-bit text characters in each block C and two of the 64 characters as 8-bit text characters in each block D of the 16 groups 300. RDS/RBDS unit 158 may repeatedly transmit a RadioText message to cause it to be displayed on a receiver continuously or for a desired length of time. Storage location 152C includes an amount of storage that is sufficient to store a 32 or 64 character RadioText message and forms a circular buffer in one embodiment.

In one embodiment, the host stores a first instance of a RadioText message in storage location 152C. The host may prevent the second and subsequent instances of the RadioText message from being provided to or stored in memory 152E in this embodiment.

In another embodiment, RDS/RBDS unit 158 stores a first instance of a RadioText message from the host in storage location 152C. RDS/RBDS unit 158 discards the second and subsequent instances of the RadioText message from memory 152.

Other examples of recurring data include Program Type code (PTY), Traffic Program code (TP), Traffic Announcement code (TA), Music/Speech switch code (M/S), Decoder Identification code (DI), and Alternate Frequency codes (AF). Additional examples of recurring data include blocks B, C or C', and D for Open Data Application groups (i.e., type 3A/3B and 4B groups) and blocks B, C or C', and D for RadioText Plus groups (i.e., type 2A/2B, 3A, and ODA xA groups).

In one embodiment, the host intermittently stores a first instance of these types of RDS/RBDS data in storage location 152B or 152C, as appropriate, and may prevent the second and subsequent instances from being provided to or stored in memory 152.

In another embodiment, RDS/RBDS unit 158 stores a first instance of these types of RDS/RBDS data in storage location 152B or 152C, as appropriate, and discards the second and subsequent instances of these types of RDS/RBDS data from memory 152E.

RDS/RBDS unit 158 and/or the host store non-recurring RDS/RBDS data in storage location 152E. RDS/RBDS unit 158 operates storage location 152E operates as a first-in-first-out (FIFO) buffer to process RDS/RBDS data received from the host in the order that it is received. As described above, RDS/RBDS unit 158 may discard any redundant data in storage location 152E to free up the storage for additional RDS/RBDS data from the host.

In some embodiments, RDS/RBDS unit 158 and/or the host may treat part of the recurring data identified above as though it is not recurring. In these embodiments, each instance of such data in various groups 300 may be provided to and stored in memory 152E and processed as other RDS/RBDS data.

RDS/RBDS unit 158 generates a continuous series of groups 300 for inclusion in baseband signals 110 as represented by groups 300(N) to 300(N+P) where N is an integer index and P is an integer offset. RDS/RBDS unit 158 generates groups 300 by selectively mixing the recurring data stored in at least storage locations 152A, 152B, and 152C with the non-recurring RDS/RBDS data in storage location 152E as indicated by an arrow 402. RDS/RBDS unit 158 mixes the recurring data and the non-recurring RDS/RBDS data in accordance with the counter, ratio, and other suitable parameters in storage location 152D and/or in accordance with the RDS/RBDS standard.

For each group 300, RDS/RBDS unit 158 includes the Program Identifier code in block A and in block C' in groups 300 where block C is replaced with block C' (i.e., in type B groups 300). RDS/RBDS unit 158 also includes the offset words A and, if used, C' that corresponds to blocks A and C'. In one embodiment, storage location 152A includes the offset words. In other embodiments, RDS/RBDS unit 158 calculates the offset words from the Program Identifier code in accordance with the RDS/RBDS standard using the checkword generation algorithm described above. By storing the Program Identifier code in storage location 152A, transmitter 100B may reduce the amount of RDS/RBDS data stored for each group 300 in storage location 152 by 25% where a group includes a block C and by 50% where a group includes block C'. In addition, where the host is configured not to provide redundant Program Identifier codes, the amount of time to transfer RDS/RBDS data from the host to memory 152 may be reduced.

RDS/RBDS unit 158 also selectively includes other recurring information from storage locations 152B and 152C (i.e., the Program Service strings and the RadioText messages) in groups 300.

For each Program Service string, RDS/RBDS unit 158 generates four type 0A or type 0B groups 300. RDS/RBDS unit 158 generates block D of each type of group 300 to include two 8-bit characters of the Program Service string. For type 0A groups 300, RDS/RBDS unit 158 generates block A to include the Program Identifier code from storage location 152A and blocks B and C to include appropriate RDS/RBDS data. For type 0B groups 300, RDS/RBDS unit 158 generates blocks A and C' to include the Program Identifier code from storage location 152A and block B to include appropriate RDS/RBDS data. In one embodiment, the RDS/RBDS data for blocks B and C may be stored by RDS/RBDS unit 158 along with a Program Service string in storage location 152B. In other embodiments, the RDS/RBDS data for blocks B and C may be stored in storage location 152E by the host.

RDS/RBDS unit 158 generates a number of sets of four groups 300 for each Program Service string in accordance with the counter parameter in storage location 152D for each Program Service string. The counter parameter provides a throttling mechanism for sending the Program Service strings and also provides additional error correction for an RDS/RBDS receiver.

For a RadioText message, RDS/RBDS unit 158 generates 16 type 2A or 2B groups 300. For type 2A groups 300, RDS/RBDS unit 158 generates blocks C and D to each include two 8-bit characters of the RadioText message. RDS/RBDS unit 158 generates block A to include the Program Identifier code from storage location 152A and block B include appropriate RDS/RBDS data for type 2A groups 300. For type 2B groups 300, RDS/RBDS unit 158 generates block D to include two 8-bit characters of the RadioText message. RDS/RBDS unit 158 generates blocks A and C' to include the Program Identifier code from storage location 152A and block B include appropriate RDS/RBDS data for type 2B groups 300. In one embodiment, the RDS/RBDS data for blocks B and C may be stored by RDS/RBDS unit 158 along with a RadioText message in storage location 152C. In other embodiments, the RDS/RBDS data for blocks B and C may be stored in storage location 152E by the host.

RDS/RBDS unit 158 generates groups 300 with other RDS/RBDS data from storage location 152E. RDS/RBDS unit 158 generates these groups 300 in accordance with the RDS/RBDS data provided from the host.

RDS/RBDS unit 158 generates Program Service string groups 300, RadioText message groups 300, and other RDS/RBDS data groups 300 in an order and in proportions indicated by the ratio parameter in storage location 152D and/or the RDS/RBDS standard. By doing so, RDS/RBDS unit 158 causes RDS/RBDS data to be processed and displayed by a receiver in a desired order and for desired amounts of time.

RDS/RBDS receivers may prohibit or otherwise limit the display of RadioText messages under certain conditions. For example, an RDS/RBDS receiver in an automobile may prevent RadioText messages from being displayed while the automobile is moving to prevent the messages from distracting a driver. The receiver may display static information, such as a Program Service string, while the automobile is moving.

In one embodiment, RDS/RBDS unit 158 transmits RadioText messages using types of groups 300 intended for Program Service strings. To do so, RDS/RBDS unit 158 breaks up a 32 or 64 character RadioText message from storage location 152C into 4 or 8 Program Service strings, respectively, forms four type 0A or type 0B groups 300 for each Program Service string, and transmits the sets of four type 0A or type 0B groups 300 to cause the Program Service strings to be sequentially displayed by an RDS/RBDS receiver. RDS/RBDS unit 158 transmits the sets of groups 300 in accordance with the counter parameters in storage location 152D to ensure that each Program Service string (i.e., each part of the RadioText message) is displayed for a sufficient time to avoid flashing the strings on the display.

By transmitting RDS/RBDS data as described above, transmitter 100B may be used in various applications. For example, transmitter 100B may transmit RDS/RBDS data associated with a digital recording to an RDS/RBDS receiver in an AM/FM radio receiver to allow an artist name and a song title of the digital recording to be displayed. As another example, transmitter 100B may transmit RDS/RBDS data with voice or caller identification information to an RDS/RBDS receiver in a phone.

Figure 1C:
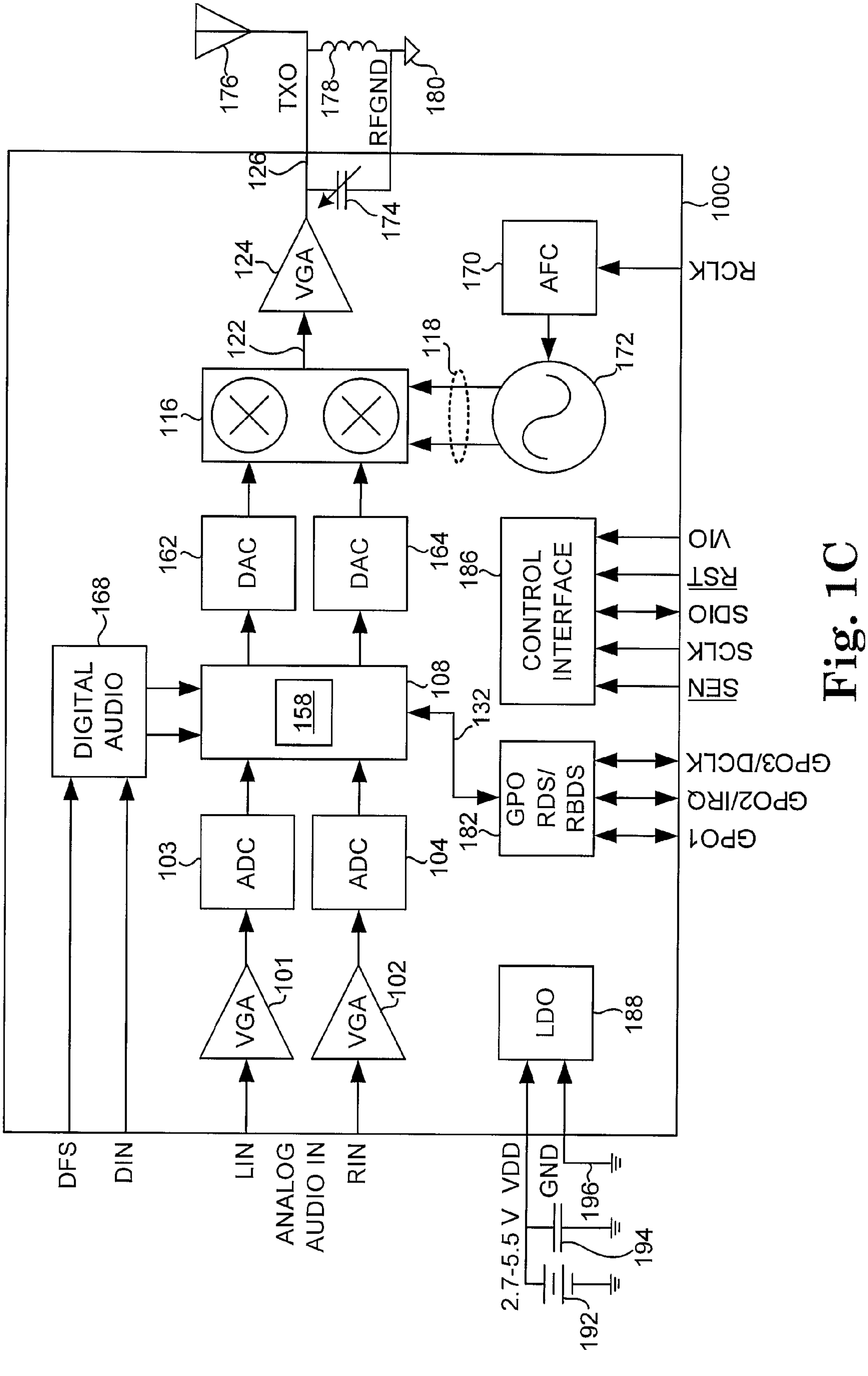

FIG. 1C is a block diagram illustrating an embodiment 100C of low-IF transmitter 100. Transmitter 100C forms an integrated terrestrial broadcast transmitter that is configured to transmit FM and AM broadcasts.

Transmitter 100C is configured to receive left (L) and right (R) analog audio input signals using LIN and RIN inputs, respectively, and digital audio input signals using digital frame synchronization (DFS) and digital audio in (DIN) inputs. VGAs 101 and 102 amplify the left (L) and the right (R) analog audio input signals, respectively. ADCs 103 and 104 convert the left (L) and the right (R) analog audio input signals, respectively, to left (L) and right (R) digital audio input signals and provide the left (L) and right (R) digital audio input signals to processing circuitry 108. A digital audio interface 168 receives the digital audio input signals and provides left (L) and right (R) digital audio input signals to processing circuitry 108.

As described above, processing circuitry 108 provides a variety of processing features, including FM and AM modulation (MOD) and stereo/audio encoding, such as MPX encoding. Processing circuitry 108 provides processed signals to DACs 162 and 164. DACs 162 and 164 convert digital real (I) and imaginary (Q) signals to real (I) and imaginary (Q) analog signals and provide the analog signals to RF mixer 116.

An external oscillator (not shown), provides a reference clock signal to an automatic frequency control (AFC) block 170 through an RCLK connection. AFC block 170 generates a reference frequency and provides the reference frequency to a frequency synthesizer 172. AFC block 170 also receives a tuning error signal from the transmit path circuitry within transmitter 100C and provide a correction control signal to frequency synthesizer 172.

Frequency synthesizer 172 receives the reference frequency and the correction control signal from AFC block 170. Frequency synthesizer 172 generates two mixing signals that are 90 degrees out of phase with each other and provides mixing signals 118 to mixer 116.

RF mixer 116 upconverts the analog signals to RF signals 122 with a desired transmit frequency (e.g., a desired FM broadcast frequency) by combining the analog signals with mixing signals 118 provided by frequency synthesizer 172. RF mixer 116 provides RF signals 122 to VGA 124. VGA 124 amplifies RF signals 122 to generate RF output signals 126 at a desired signal level.

RF output signals 126 are provided to an antenna 176 connected to a TXO connection. An inductance 178 couples between the TXO connection and a RFGND connection which is coupled to a ground 180. An on-chip variable capacitor circuit 174 connects between the TXO and the RFGND connections and is used to tune the output circuit.

Figure 5:
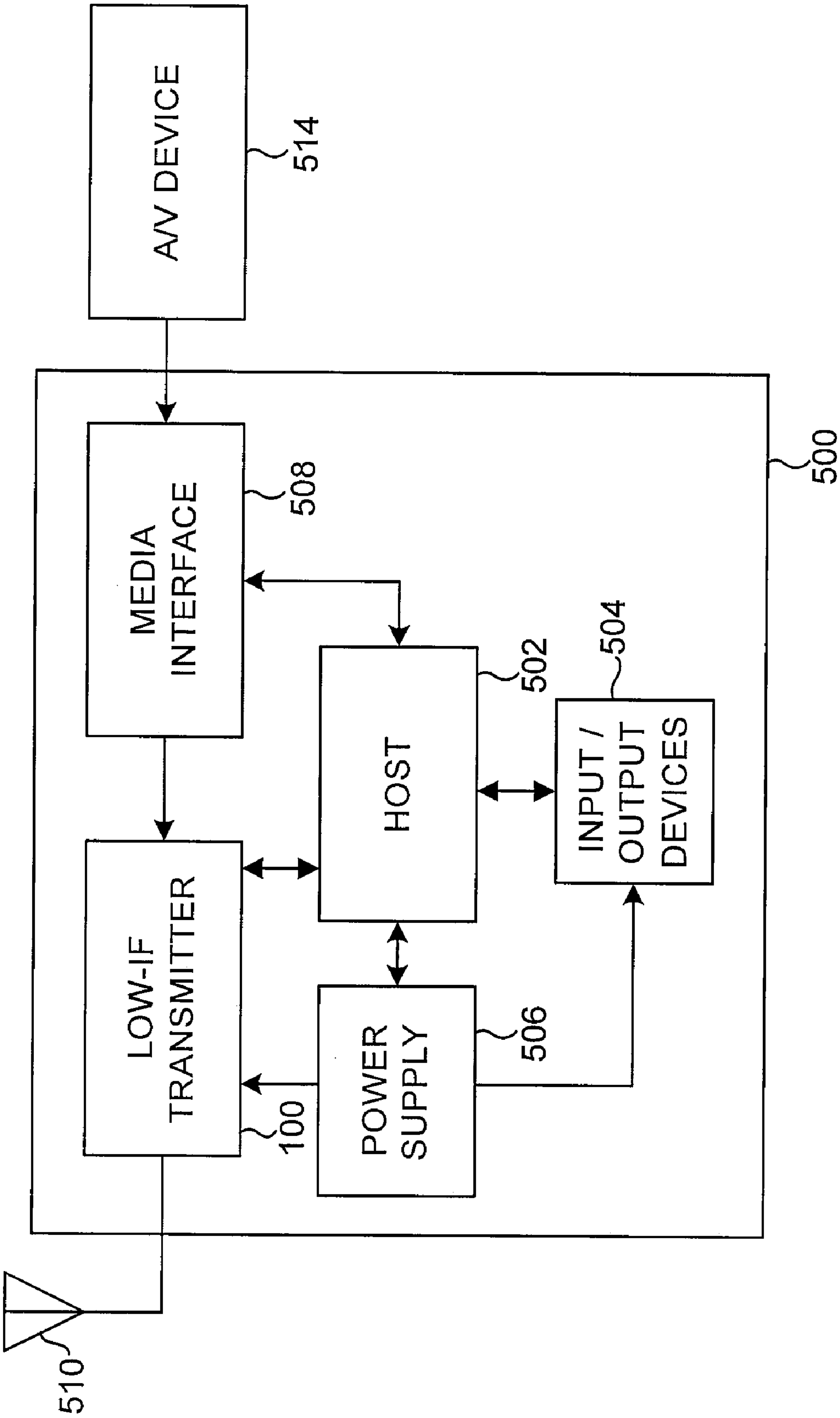
FIG. 5 is a block diagram illustrating one embodiment of a device that includes a low-IF transmitter.

A GPO RDS/RBDS interface 182 to receives RDS/RBDS data from a host (shown in FIG. 5). GPO RDS/RBDS interface 182 includes a bi-directional GPO1 signal, a bi-directional GPO2/IRQ signal, and a bi-directional GPO3/DCLK signal. GPO RDS/RBDS interface 182 provides RDS/RBDS signal 132 to processing circuitry 108. Processing circuitry 108 processes and transmits RDS/RBDS data in RDS/RBDS signal 132 as described above with reference to FIGS. 1A and 1B.

A digital control interface 186 communicates with external devices, such as a host (shown in FIG. 5). Control interface 186 includes a serial interface enable (SEN_) input signal, a serial clock input (SCLK) signal, a bi-directional serial data input/output (SDIO) signal, a reset (RST_) input signal, and a VIO signal. In other embodiments, other communication interfaces may be used, if desired, including serial or parallel interfaces that use synchronous or asynchronous communication protocols.

An integrated supply regulator (LDO) block 188 regulates the on-chip power using a supply voltage, VDD (2.7-5.5 V), from a power supply 192 across a capacitor 194 and connects to a ground connection (GND) 196.

In other embodiments, transmitters 100A, 100B, and 100C may have other transmitter architectures other than the low-IF architectures described above. In addition, transmitters 100A, 100B, and 100C may be combined with receiver circuitry to form transceivers 100A, 100B, and 100C in other embodiments.

FIG. 5 is a block diagram illustrating one embodiment of a device 500 that includes low-IF transmitter 100. Device 500 may be any type of portable or non-portable electronic device such as a mobile or cellular telephone, a personal digital assistant (PDA), an audio and/or video player (e.g., an MP3 or DVD player), an audio and/or video system (e.g., a television or stereo system), a wireless telephone, a desktop or laptop computer, or a peripheral card (e.g., a USB card) that couples to a computer. Device 500 includes low-IF transmitter 100, a host 502, one or more input/output devices 504, a power supply 506, a media interface 508, an antenna 510, and an audio/video (A/V) device 514, among other components.

Low-IF transmitter 100 broadcasts signals received from host 502 and/or across media interface 508 using antenna 510. Low-IF transmitter 100 receives digital signals from host 502 and analog signals from A/V device 514 via media interface 508. Low-IF transmitter 100 may selects a broadcast channel for the broadcast signals in response to channel selection inputs from host 502.

Host 502 provides digital signals, channel selection inputs, and other control inputs to low-IF transmitter 100. Host 502 provides the digital signals to low-IF transmitter 100 in any suitable digital or audio format (e.g., MP3 or iTunes). Host 502 also provides RDS/RBDS data to transmitter 100. Host 502 controls the operation of input/output devices 504, power supply 506, and media interface 508. Host 502 provides information to and receives information from (e.g., channel selection inputs) a user using input/output devices 504.

Input/output devices 504 receive information from a user and provide the information to host 502. Input/output devices 504 also receive information from host 502 and provide the information to a user. The information may include RDS/RBDS data, channel selection information, voice and/or data communications, audio, video, image, or other graphical information. Input/output devices 504 include any number and types of input and/or output devices to allow a user provide information to and receive information from device 500. Examples of input and output devices include a microphone, a speaker, a keypad, a pointing or selecting device, and a display device.

Power supply 506 provides power to low-IF receiver 100, host 502, input/output devices 504, and media interface 508. Power supply 506 includes any suitable portable or non-portable power supply such as a battery or an AC plug.

A/V device 514 provides analog signals to media interface 508 for transmission by low-IF transmitter 100. A/V device 514 may be any suitable A/V device configured to generate analog audio and/or video signals. Media interface 508 receives the analog signals from A/V device 514 and provides the analog audio signals to low-IF transmitter 100.

In the above embodiments, processing circuitry 108 includes hardware, software, firmware, or a combination of these. In one embodiment, components of processing circuitry 108, such as RDS/RBDS unit 158, may form a program product with instructions that are accessible to and executable by processing circuitry 108 to perform the functions of processing circuitry 108 described above. The program product may be stored in any suitable storage media that is readable by processing circuitry 108. The storage media may be within or external to processing circuitry 108.

In the above embodiments, at least processing circuitry 108, low-IF generation circuitry 112, mixer 116, and LO generation circuitry 130 may be located on-chip and integrated on the same integrated circuit (i.e., on a single chip that is formed on a common substrate). An antenna that couples to VGA 124 (such as antenna 176 in FIG. 1C or antenna 510 in FIG. 5) may be located off-chip (i.e., external to the common substrate that includes receiver 100). In other embodiments, other components of transmitter 100 may be located off-chip.

In the above embodiments, a variety of circuit and process technologies and materials may be used to implement the transmitters described above. Examples of such technologies include metal oxide semiconductor (MOS), p-type MOS (PMOS), n-type MOS (NMOS), complementary MOS (CMOS), silicon-germanium (SiGe), gallium-arsenide (GaAs), silicon-on-insulator (SOI), bipolar junction transistors (BJTs), and a combination of BJTs and CMOS (BiCMOS).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A transmitter comprising:

first circuitry configured to store a first instance of recurring RDS/RBDS data from a host;

second circuitry configured to prevent a second and subsequent instances of the recurring RDS/RBDS data from the host from being stored and configured to generate at least two RDS/RBDS groups using at least a portion of the first instance of the recurring RDS/RBDS data stored by the first circuitry; and third circuitry configured to transmit the at least two RDS/RBDS groups as part of an FM broadcast signal.

2. The transmitter of claim 1 wherein the second circuitry is configured to discard the second and the subsequent instances of the recurring RDS/RBDS data.

3. The transmitter of claim 1 wherein the second circuitry is configured to allow the host to store the first instance of the recurring RDS/RBDS data in a designated storage location.

4. The transmitter of claim 1 wherein the second circuitry is configured to generate the at least two RDS/RBDS groups in accordance with a parameter provided by the host.

5. The transmitter of claim 1 wherein the recurring RDS/RBDS data includes a Program Identifier code.

6. The transmitter of claim 1 wherein the recurring RDS/RBDS data includes at least one Program Service string.

7. The transmitter of claim 1 wherein the recurring RDS/RBDS data includes one of a RadioText message, a RadioText Plus message, and an Open Data Application message.

8. The transmitter of claim 1 wherein the recurring RDS/RBDS data includes at least one of a Program Type code, a Traffic Program code, a Traffic Announcement code, a Music/Speech switch code, a Decoder Identification code, and an Alternate Frequency code.

9. A method performed by a transmitter, the method comprising:

storing a first instance of first recurring RDS/RBDS data from a host;

preventing a second and subsequent instances of the first recurring RDS/RBDS data from the host from being stored;

generating a first set of at least two RDS/RBDS groups using at least a portion of the first instance of the first recurring RDS/RBDS data; and transmitting the first set of at least two RDS/RBDS groups as part of an FM broadcast signal.

10. The method of claim 9 further comprising:

discarding the second and the subsequent instances of the first recurring RDS/RBDS data.

11. The method of claim 9 further comprising:

allowing a host to store the first instance of the first recurring RDS/RBDS data in a designated storage location.

12. The method of claim 9 further comprising:

storing a first instance of second recurring RDS/RBDS data from the host;

preventing a second and subsequent instances of the second recurring RDS/RBDS data from the host from being stored;

generating a second set of at least two RDS/RBDS groups using at least a portion of the first instance of the second recurring RDS/RBDS data; and transmitting the second set of at least two RDS/RBDS groups as part of the FM broadcast signal.

13. The method of claim 12 further comprising:

generating the first and the second sets of at least two RDS/RBDS groups in accordance with a parameter provided by the host.

14. The method of claim 12 further comprising:

generating the second set of at least two RDS/RBDS groups using at least the portion of the first instance of the first recurring RDS/RBDS data and at least the portion of the first instance of the second recurring RDS/RBDS data.

15. The method of claim 14 where the first recurring RDS/RBDS data includes a Program Identifier code and wherein the second recurring RDS/RBDS data includes one of a Program Service string and a RadioText message.

16. A program product comprising:

a program executable by processing circuitry for causing a transmitter to:

store a first instance of recurring RDS/RBDS data from a host;

prevent a second and subsequent instances of the recurring RDS/RBDS data from the host from being stored;

generate at least two RDS/RBDS groups using at least a portion of the first instance of the recurring RDS/RBDS data; and transmit the at least two RDS/RBDS groups as part of an FM broadcast signal; and a medium that stores the program so that the program is accessible by the processing circuitry.

17. The program product of claim 16 wherein the program is executable by the processing circuitry for causing the processing circuitry to include the at least two RDS/RBDS groups as part of a baseband signal used to generate the FM broadcast signal.

18. The program product of claim 16 wherein the program is executable by the processing circuitry for causing the processing circuitry to discard the second and the subsequent instances of the recurring RDS/RBDS data.

19. The program product of claim 16 wherein the program is executable by the processing circuitry for causing the processing circuitry to allow the host to store the first instance of the recurring RDS/RBDS data in a designated storage location.

20. The program product of claim 16 wherein the program is executable by the processing circuitry for causing the processing circuitry to generate the at least two RDS/RBDS groups in accordance with a parameter provided by the host.

21. A system comprising:

a transmitter configured to store a first instance of recurring RDS/RBDS data, prevent a second and subsequent instances of the recurring RDS/RBDS data from being stored, generate at least two RDS/RBDS groups using at least a portion of the first instance of the recurring RDS/RBDS data, and transmit the at least two RDS/RBDS groups as part of an FM broadcast signal; and a host configured to provide at least the first instance of the recurring RDS/RBDS data to the transmitter.

22. The system of claim 21 wherein the transmitter is configured to receive a digital audio signal, and wherein the transmitter is configured to transmit the digital audio signal as part of the FM broadcast signal.

23. The system of claim 21 wherein the transmitter is configured to receive a analog audio signal, and wherein the transmitter is configured to transmit the analog audio signal as part of the FM broadcast signal.

* * * * *